(12) United States Patent
Freadman

(10) Patent No.: US 6,288,749 B1
(45) Date of Patent: *Sep. 11, 2001

(54) COMPUTER SYSTEM WITH REMOTE TELEVISION DISPLAY

(75) Inventor: Tommyca Freadman, Goshen, NY (US)

(73) Assignee: Altec Lansing Technologies, Inc., Milford, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/746,870

(22) Filed: Nov. 16, 1996

Related U.S. Application Data

(60) Provisional application No. 60/006,950, filed on Nov. 16, 1996.

(51) Int. Cl.[7] .............................. H04N 7/10; H04N 7/00; H04N 11/00
(52) U.S. Cl. .............................. 348/552; 725/74; 725/78; 725/148; 725/153
(58) Field of Search .................................... 348/552, 9, 8, 348/10, 12, 13, 6, 7, 1, 3, 5.5; 455/4.2, 5.1, 6.2; 725/74, 78, 81, 82, 83, 85, 143, 148, 149, 151, 152, 153; H04N 11/00, 7/10, 7/00

(56) References Cited

U.S. PATENT DOCUMENTS

| | | | |
|---|---|---|---|
| Re. 33,808 | * 1/1992 | Wright, Jr. ............................. | 348/9 |
| 4,268,859 | * 5/1981 | Ost ........................................ | 348/3 |
| 4,439,784 | * 3/1984 | Furukawa et al. ................... | 455/4 |
| 4,633,462 | * 12/1986 | Stifle et al. .......................... | 455/5 |
| 4,775,928 | * 10/1988 | Kendall et al. ...................... | 364/200 |
| 5,260,778 | * 11/1993 | Kauffman et al. ................... | 455/6.2 |
| 5,389,964 | * 2/1995 | Oberle et al. ........................ | 348/9 |
| 5,418,559 | * 5/1995 | Blahut .................................. | 348/10 |
| 5,661,517 | * 8/1997 | Budow et al. ........................ | 348/13 |

* cited by examiner

Primary Examiner—Michael Lee
(74) Attorney, Agent, or Firm—Greenberg Traurig LLP

(57) ABSTRACT

A computer system with a remote television display converts output signals from a computer to video signals to be displayed on at least one television set and transmits the output signals from the computer along with broadcast and cable video signals to the at least one television set so that one or more televisions may be used as remote display devices. The system includes a computer for generating an output signal and for receiving an input signal, a television broadcast source for generating first multichannel television signal, a signal converter for receiving the output signal and converting it to a first channel television signal, the signal converter also for receiving the first multichannel television signal, the converter outputting at least part of the first multichannel television signal and the first channel television signal as a second multichannel television signal, a television for receiving the second multichannel television signal and displaying one channel of the second multichannel television signal and an input device located remote from the computer for transmitting input signals to the computer.

17 Claims, 2 Drawing Sheets

COMPUTER SYSTEM WITH REMOTE TELEVISION DISPLAY

This application is a regular utility application which claims the priority of the provisional patent application No. 60/006,950 filed on Nov. 16, 1996, now abandoned.

FIELD OF THE INVENTION

The present invention relates to computers, local computer networks, and televisions. More specifically, the present invention relates to the use of televisions in association with a computer system, allowing for remote operation of the computer and allowing the television to access computer signals and broadcast and cable signals and display video images corresponding to the accessed computer signals and broadcast and cable signals.

DISCUSSION OF RELATED ART

It is known in the art to use a television monitor in the place of a computer monitor screen as a display device. Devices exist which convert a computer's video display signal, also known as a VGA signal, into a NTSC-standard video signal which may be interpreted and displayed by a television set. The signal conversion operates independent from the television set, where the television set is not itself specifically modified for use with the computer.

It is also known in the art to integrate televisions and computers in the form of an interactive television system. In such an interactive television system, a computer is connected to a remote television signal broadcast source. The computer sends a data signal along with the broadcast signal, usually through a hard-wired cable or fiber-optic connection. In the home, a set-top unit interprets the data signal and can present the broadcast signal or the data signal to the television's input. The home user can interact with the system through the set-top unit, which transmits a data signal back through the hard-wired connection to the broadcast source and connected computer. Such interactive television systems require significant expense to create both the system and the content transmitted, which content is controlled by the broadcast source.

With an individual computer system, transmission of data between the central processing unit of the computer and peripheral devices may occur through data cables, which may be RS-232 cables or monitor cables. It is also known in the art to use remote radio frequency (RF) or infrared signals to exchange data between various pieces of computer hardware.

SUMMARY OF THE INVENTION

The preferred embodiments of the present invention provide an apparatus for converting output signals from a computer to video signals to be displayed on at least one television set and transmitting the output signals from the computer along with broadcast and cable video signals to the at least one television set. Using the preferred embodiments of the present invention, one or more televisions may be used as remote display devices and remote input devices are provided to control how output signals from one or more computers are displayed on one or more televisions.

In a preferred embodiment, a computer system with remote television display includes a computer for generating an output signal and for receiving an input signal, a television broadcast source for transmitting a first multichannel television signal, a signal converter for receiving the output signal from the computer and converting the output signal to at least one single channel television signal, the signal converter also for receiving the first multichannel television signal, the converter outputting at least part of the first multichannel television signal and the at least one single channel television signal as a second multichannel television signal, a television for receiving the second multichannel television signal and displaying one channel of the second multichannel television signal and an input device located remote from the computer for transmitting input signals to the computer.

In a preferred embodiment, the signal converter converts the computer's display signal into a signal having a channel frequency which can be received by and displayed on the at least one television. The signal converter preferably includes suitable signal processing hardware and/or software such as a comb filter for preventing signals output from the computer from being transmitted back out to the television broadcast source. The signal converter also preferably includes a notch filter for allowing selected television signals to be transmitted therethrough and for attenuating at least one input channel frequency so as to prevent signals having the selected input channel frequency from being transmitted from the signal converter. The notch filter is preferably controllable via input signals sent from the input device to the computer so as to allow a user to select a desired channel frequency or frequencies to be notched or attenuated.

Using the input device for transmitting signals to the computer, the user can activate the signal converter so as to display output signals from the computer on the at least one television for viewing the computer display images on the television. In addition, the user can use the input device to the computer to select the number and specific channel frequencies that are to display the output signals from the computer.

The input device preferably comprises a remote access device, such as a pointer or keyboard which is used to transmit instruction signals, preferably via radio frequency or some other remote data transmission protocol, to a signal receiver, such as a conventional radio frequency receiver which is preferably connected to the computer. In another preferred embodiment, the signal converter and signal receiver may be provided in the same unit which is connected to the at least one computer.

The computer may have a plurality of signal outputs including a VGA output and a DVD output. The plurality of signal outputs may be preferably connected to the signal converter or combined signal converter/receiver for transmitting a plurality of output computer signals which can then be output along with the remaining television signals as a multichannel television signal.

The at least one computer is preferably connected to the signal converter which is connected to the television broadcast line for a television, such that the signals output from the computer are converted from, for example, a VGA format, into a television channel signal which may be displayed on a television. The converted signal from the computer is combined with the signal feed from the television broadcast line such that the user may select the computer output as a channel on the television set. The command input to the computer may be preferably connected to a radio frequency receiver and controller, which receives signals from remote command units and converts those signals into commands for the computer.

Although only one computer is mentioned above, it is possible to connect a plurality of computers to the signal converter or the combined signal converter/receiver so as to allow a plurality of computer users to view the display of any connected computer.

Other features and advantages of the preferred embodiments of the present invention will become apparent from the following description of the preferred embodiments of the present invention which are shown in the accompanying drawings.

DETAILED DESCRIPTION OF PREFERRED EMBODIMENTS

Figure 1:
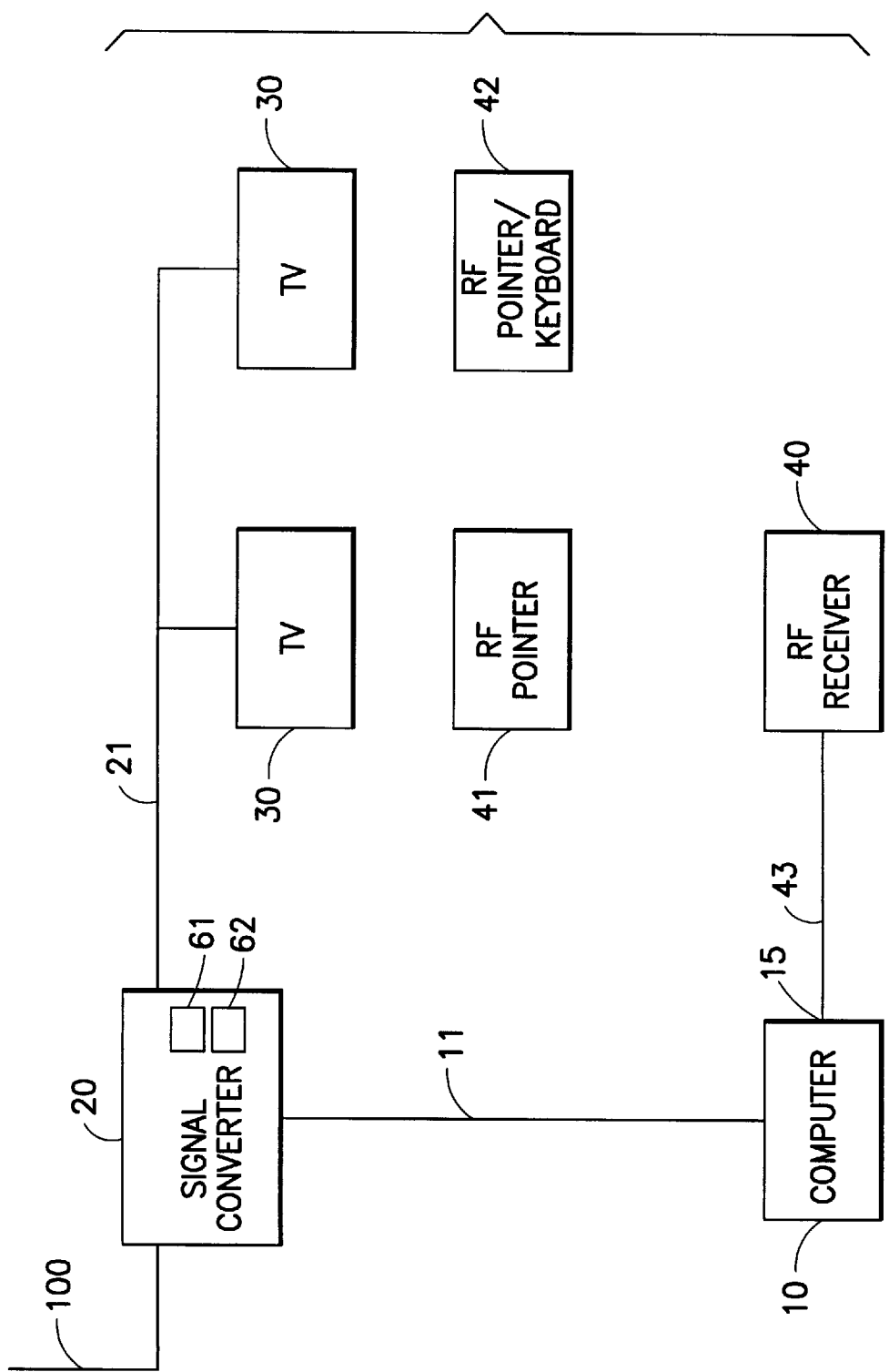
FIG. 1 is a block diagram of a preferred embodiment of the system according to the present invention.

As shown in FIG. 1, a preferred embodiment of the present invention includes a computer 10 connected, either directly or remotely, to a signal converter 20, which is in turn connected to one or more televisions 30. An external television broadcast source 100 is preferably connected to the signal converter 20 via a signal feed 21. Signal converter 20 preferably includes a least one comb filter 61 and a notch filler 62. Data input devices in the form of an RF pointer 41 or RF pointer/keyboard 42 both of which include conventional remote control transmitters and antennas are preferably provided for controlling the computer and images displayed on the one or more televisions 30 as described in more detail below. A signal receiver 40 is preferably provided and is connected to the computer 10 via line 43 or other suitable connection.

The one or more outputs 11 of the computer 10, which may include a VGA output and a DVD output, are preferably connected to the signal converter 20 which converts the output computer signals to television channel signals having one or more desired frequencies corresponding to one or more selected television channels. The signal converter 20 preferably comprises suitable signal processing hardware and/or software for converting the signals output from the computer to television signals. For example, the converter preferably includes appropriate signal processing hardware and software for frequency division multiplexing processing of the output signals to convert the computer signals to television signals.

In a preferred embodiment, the signal converter 20 includes at least one comb filter 61 for preventing signals output from the computer 10 from being transmitted back out through the signal feed 21 to the external television broadcast source 100. The signal converter 20 also preferably includes a notch filter 62 for allowing selected television signals to be output therefrom and for attenuating at least one input channel frequency so as to prevent signals having the selected input channel frequency from being transmitted from the signal converter 20 to the televisions 30. The notch filter is preferably controllable via input signals input via the input devices 41, 42 to the computer 10 so as to allow a user to select a desired channel frequency or frequencies to be notched or attenuated.

The signal feed 21 is preferably a standard hard-wired cable or antenna hookup which connects an external broadcast source 100 to multiple connections located throughout a building, which connections provide signals to one or more television sets 30.

The data input devices, such as RF pointer 41 or RF pointer/keyboard 42, transmit instruction or data signals to the RF receiver 40 connected to the computer 10. Using the devices 41, 42, a user can select the number of television channel frequencies to be notched or attenuated by the converter 20 according to the desired number of television channels selected to display images generated from the computer signals. In addition, the devices 41, 42 can be used to send instruction signals to the computer 10 for identifying the desired channels upon which the computer signals are to be displayed. Although the instructions regarding which television channels are to display the converted computer output signals are preferably sent via remote control communication, this transmission may occur through a hard-wired connection.

Receiver 40 is connected to input 15 of computer 10 and communicates the instruction signals from the data input devices 41, 42 to the computer 10 via connection 43. Connection 43 between receiver 40 and input 15 of computer 10 may be RS-232 cable or USB (Universal Signal Bus) or other suitable connection.

One computer 10 may serve a number of users, if multitasking software is operating on the computer 10. With multitasking, the computer 10 outputs a plurality of display signals which are each converted to different television channels. Multiple users of the computer system may choose to view different or the same computer output signals on separate television sets 30. Messaging software maybe included in the computer 10 to transmit messages between users operating separate television sets 30.

Figure 2:
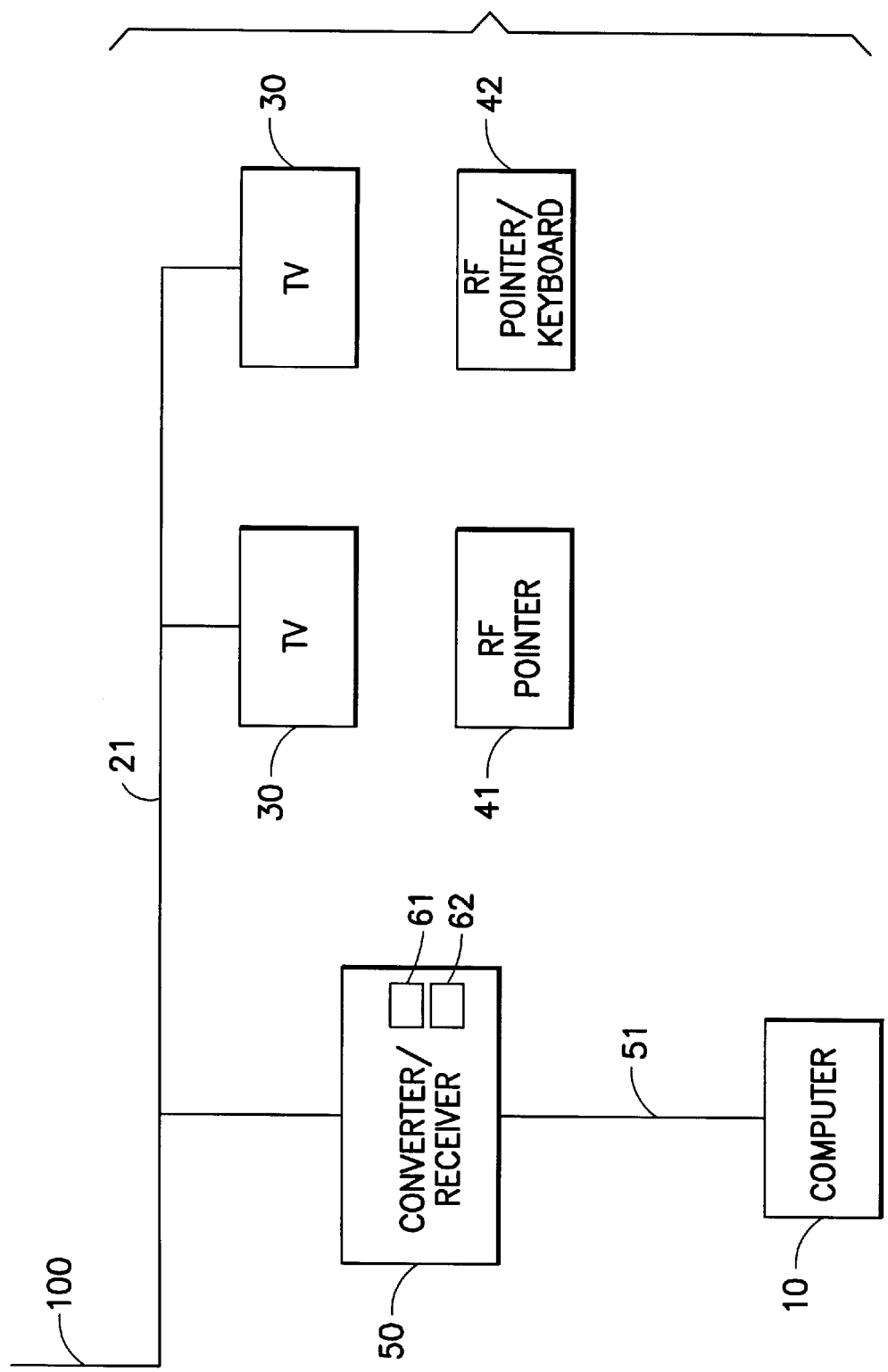
FIG. 2 is a block diagram of another preferred embodiment of the system according to the present invention including a combined converter and receiver device.

The signal converter 20 and receiver 40 may be implemented into one device, as shown in FIG. 2. Along with this implementation, the wired data connection 51 between the computer 10 and the combined converter/receiver 50 may be of a more advanced nature, such as the USB (Universal Signal Bus) format.

Although the signal converter 20 is shown in FIG. 1 as being connected, for example, hard-wired, to the signal feed 21 of the television sets 30, the signal converter 40 may include an antenna and transmit the converted television channel signals to be received by an antenna on the television set 30. For example, in FIG. 2, the signal converter/receiver 50 may include an antenna for transmitting the converted signals to the antennas provided on the televisions 30.

While certain novel features of the preferred embodiments of this invention have been shown and described and are pointed out in the annexed claims, it will be understood that various omission, substitutions and changes in the forms and details of the device illustrated and in its operation can be made by those skilled in the art without departing from the spirit of the invention.

What is claimed is:

1. A computer system with remote television display comprising:

a computer for generating an output signal and for receiving an input signal;

an external television broadcast source for transmitting a first multichannel television signal;

a signal converter for receiving the output signal from the computer and converting the output signal to a first television channel signal, the signal converter being arranged to receive the first multichannel television signal from the television broadcast source, the signal converter outputting at least part of the first multichannel television signal and the first channel television signal as a second multichannel television signal, the signal converter including means for enabling a user to select television signals to be transmitted therethrough and for attenuating at least one input channel frequency so as to prevent signals having the selected input channel frequency from being output from the signal converter;

at least one television in a local network for receiving the second multichannel television signal and displaying at least one channel of the second multichannel television signal, the local network connecting the signal converter to the computer and to the at least one television, the signal converter being connected to the external television broadcast source outside of the local network; and at least one input device located remote from the computer for transmitting the input signal to the computer.

2. The computer system of claim 1, wherein the signal converter includes a remote control signal receiver for receiving remote control signals from the at least one input device for controlling the signal converter.

3. The computer system of claim 1, wherein the signal converter comprises a signal processing device for converting the output signal from the computer into a channel frequency which can be received by and displayed on the at least one television.

4. The computer system of claim 1, wherein the signal converter includes a comb filter for preventing signals output from the computer from being transmitted back out to the television broadcast source.

5. The computer system of claim 1, wherein the means for selecting television signals comprises a notch filter controllable via input signals input via the input device to the computer so as to allow a user to select a desired channel frequency to be attenuated by the notch filter.

6. The computer system of claim 1, wherein the at least one input device comprises a radio frequency signal transmitting device.

7. The computer system of claim 1, wherein the at least one input device comprises at least one of a remote transmitting keyboard and a remote transmitting pointer.

8. The computer system of claim 1, wherein the at least one input device is adapted to transmit signals to the computer to control the signal converter so as to display output signals from the computer on at least one desired channel of the at least one television.

9. The computer system of claim 1, wherein the at least one input device is adapted to output signals for selecting at least one channel frequency of the second multichannel television signal that is to display the output signals from the computer.

10. A computer system with remote television display comprising:

a computer for generating an output signal and for receiving an input signal;

an external television broadcast source for transmitting a first multichannel television signal;

a signal converter for receiving the output signal from the computer and converting the output signal to a first television channel signal, the signal converter being arranged to receive the first multichannel television signal from the television broadcast source, the signal converter outputting at least part of the first multichannel television signal and the first channel television signal as a second multichannel television signal, the signal converter including means for selecting television signals to be transmitted therethrough and for attenuating at least one input channel frequency so as to prevent signals having the selected input channel frequency from being output from the signal converter;

at least one television in a local network for receiving the second multichannel television signal and displaying at least one channel of the second multichannel television signal, the local network connecting the signal converter to the computer and to the at least one television, the signal converter being connected to the external television broadcast source outside of the local network; and at least one input device located remote from the computer for transmitting the input signal to the computer, the at least one input device arranged to allow a user to select at least one channel on which the output signals from the computer are to be displayed on at least one selected television, the selection of the at least one channel selected by a user via the at least one input device.

11. The computer system of claim 10, wherein the signal converter includes a remote control signal receiver for receiving remote control signals from the at least one input device for controlling the signal converter.

12. The computer system of claim 10, wherein the signal converter includes a comb filter for preventing signals output from the computer from being transmitted back out to the television broadcast source.

13. The computer system of claim 10, wherein the means for selecting television signals comprises a notch filter controllable via input signals input via the input device to the computer so as to allow a user to select a desired channel frequency to be attenuated by the notch filter.

14. The computer system of claim 10, wherein the at least one input device comprises a radio frequency signal transmitting device.

15. The computer system of claim 10, wherein the at least one input device comprises at least one of a remote transmitting keyboard and a remote transmitting pointer.

16. The computer system of claim 10, wherein the at least one input device is adapted to transmit signals to the computer to control the signal converter so as to display output signals from the computer on at least one desired channel of the at least one television.

17. A computer system with remote television display comprising:

a computer for generating a plurality of output signals from multitasking software and for receiving an input signal, the plurality of output signals each separately generated from multitasking software;

an external television broadcast source for transmitting a first multichannel television signal;

a signal converter for receiving the output signals from the computer and converting each output signal to a separate television channel signal, the signal converter being arranged to receive the first multichannel television signal from the television broadcast source, the signal converter outputting at least part of the first multichannel television signal and at least part of each separate television channel signal as a second multichannel television signal, the signal converter including means for selecting television signals to be transmitted therethrough and for attenuating at least one input channel frequency so as to prevent signals having the selected input channel frequency from being output from the signal converter;

at least one television in a local network for receiving the second multichannel television signal and displaying at least one channel of the second multichannel television signal, the local network connecting the signal converter to the computer and to the at least one television, the signal converter being connected to the external television broadcast source outside of the local network; and at least one input device located remote from the computer for transmitting the input signal to the computer, the at least one input device arranged to select a channel for displaying the output signals from the computer on at least one selected channel of at least one selected television.

* * * * *